X-Y PLATEN ASSEMBLY

Filed April 27, 1965 7 Sheets-Sheet 1

INVENTOR.
Warren D. Novak
BY
Wood, Herron & Evans
ATTORNEYS

INVENTOR
Warren D. Novak
BY
Wood, Herron and Evans
ATTORNEYS

Oct. 15, 1968 W. D. NOVAK 3,405,996

X-Y PLATEN ASSEMBLY

Filed April 27, 1965 7 Sheets-Sheet 3

INVENTOR.
Warren D. Novak
BY
Wood, Herron and Evans
ATTORNEYS

Oct. 15, 1968 W. D. NOVAK 3,405,996

X-Y PLATEN ASSEMBLY

Filed April 27, 1965 7 Sheets-Sheet 4

INVENTOR.
Warren D. Novak
BY
Wood, Herron and Evans
ATTORNEYS

Oct. 15, 1968 W. D. NOVAK 3,405,996

X-Y PLATEN ASSEMBLY

Filed April 27, 1965 7 Sheets-Sheet 5

INVENTOR
Warren D. Novak
BY
Wood, Herron and Evans
ATTORNEYS

Oct. 15, 1968 W. D. NOVAK 3,405,996

X-Y PLATEN ASSEMBLY

Filed April 27, 1965 7 Sheets-Sheet 6

INVENTOR.
Warren D. Novak
BY
Wood, Herron and Evans
ATTORNEYS

Oct. 15, 1968 W. D. NOVAK 3,405,996

X-Y PLATEN ASSEMBLY

Filed April 27, 1965 7 Sheets-Sheet 7

INVENTOR.
Warren D. Novak

BY
Wood, Herron and Evans
ATTORNEYS

United States Patent Office 3,405,996
Patented Oct. 15, 1968

3,405,996
X-Y PLATEN ASSEMBLY

Warren D. Novak, Chappaqua, N.Y., assignor to The Mosler Safe Company, Hamilton, Ohio, a corporation of New York Filed Apr. 27, 1965, Ser. No. 451,147
26 Claims. (Cl. 355—42)

ABSTRACT OF THE DISCLOSURE

A positioning apparatus for locating a multi-image microfilm card at a viewing station using a stationary frame and two movable frames. The microfilm card is secured to one of the movable frames and is movable in two directions by a pair of motors fixedly mounted on the stationary frame.

This invention relates to a slide assembly for positioning a card or other object relative to a viewing or operating station. More specifically, this invention is directed to a novel, two dimensional, slide positioning system for locating a multi-image microfilm card in front of a viewing station such that the information contained in one of the film images of the card may be viewed, printed or otherwise put to use.

The apparatus of the present invention is particularly suited for use in a card filing system of the type shown and described in U.S. patent application Ser. No. 279,260, filed May 9, 1963 and assigned to the assignee of the present invention, and the specification of that application is incorporated herein by reference. Basically, the card filing apparatus disclosed in the above identified application comprises an indexable filing drum rotatable about a horizontal axis and having a plurality of separate storage pockets or compartments located around its peripheral surface. The pockets are radially accessible from the outer surface of the drum and their bottoms are provided with air ejection openings. The file cards are coded by means of notches cut into their upper edges, and a row of extensible fingers located at an access station adjacent the uppermost pocket of the card is selectively movable to a position overlying the top edges of the cards in the pocket at the station. A nozzle is provided adjacent the bottom of the pocket at the access station for issuing a stream of air through the ejection opening therein.

To remove a desired card from the filing drum, the drum is first indexed to bring the pocket in which the desired card is located, to the access station. Selected fingers corresponding in position to notches in the card to be selected are then extended over the top edges of the cards in the pocket. Following this, the nozzle adjacent the bottom of the pocket at the access station is opened to issue a stream of air through the ejection opening, and at the same time the drum is rotated through a small arc relative to the nozzle to effect a scanning of the cards in the pocket by the air stream. The laminar drag of the air stream across the surfaces of the cards tends to pull them outwardly, but the fingers extending over their top edges prevent the ejection of any card not having notches corresponding to the positions of the fingers. The desired card is not subject to such a restraint, however, and moves into the fingers to the full depth of the notches under the influence of the air stream, thereby identifying that card as the selected one. The nozzles then close, the extended fingers are retracted, and the selected card is withdrawn by means of a drive roller transport mechanism which transports the selected card into the X-Y platen assembly of this application. Once the card, which contains a plurality of micro-images is located on the X-Y platen, it is clamped so as to positively locate all of the micro-images in a common or focal plane for viewing by a microtelevisor or for projection onto a screen or for other use of the information. A slide, upon which the card is clamped, is then moved under the control of the pair of motors in both the X and Y planes so as to locate that image containing the desired information in front of a projection lamp so that the desired image may be viewed by a microtelevisor or projected onto a reader printer or a viewing station.

It has been an object of this invention to provide an X-Y platen assembly for locating a card or other object in front of a viewing or operating station quickly and accurately under the control of a pair of motors, one motor for each of the two axes (or coordinates) within which the card or object is movable.

Still another objective of this invention has been to provide a novel positioning system for quickly moving and accurately locating a slide in either of two axes (or coordinates) under the control of a pair of independently movable motors. To maximize the accuracy of the system the inertia of the slide has been kept to a minimum so that it may be accurately stopped in a predetermined position. For this reason, each of the motors are mounted so that they do not move with the slide and are connected to the movable slide through a system of flexible and non-stretchable metal cables.

The foregoing and other objects, features and advantages of the invention will be more readily apparent to those skilled in the art to which this invention pertains from the following more detailed description of a preferred embodiment of the invention, as illustrated in the accompanying drawings, in which.

Figures 1, 2:
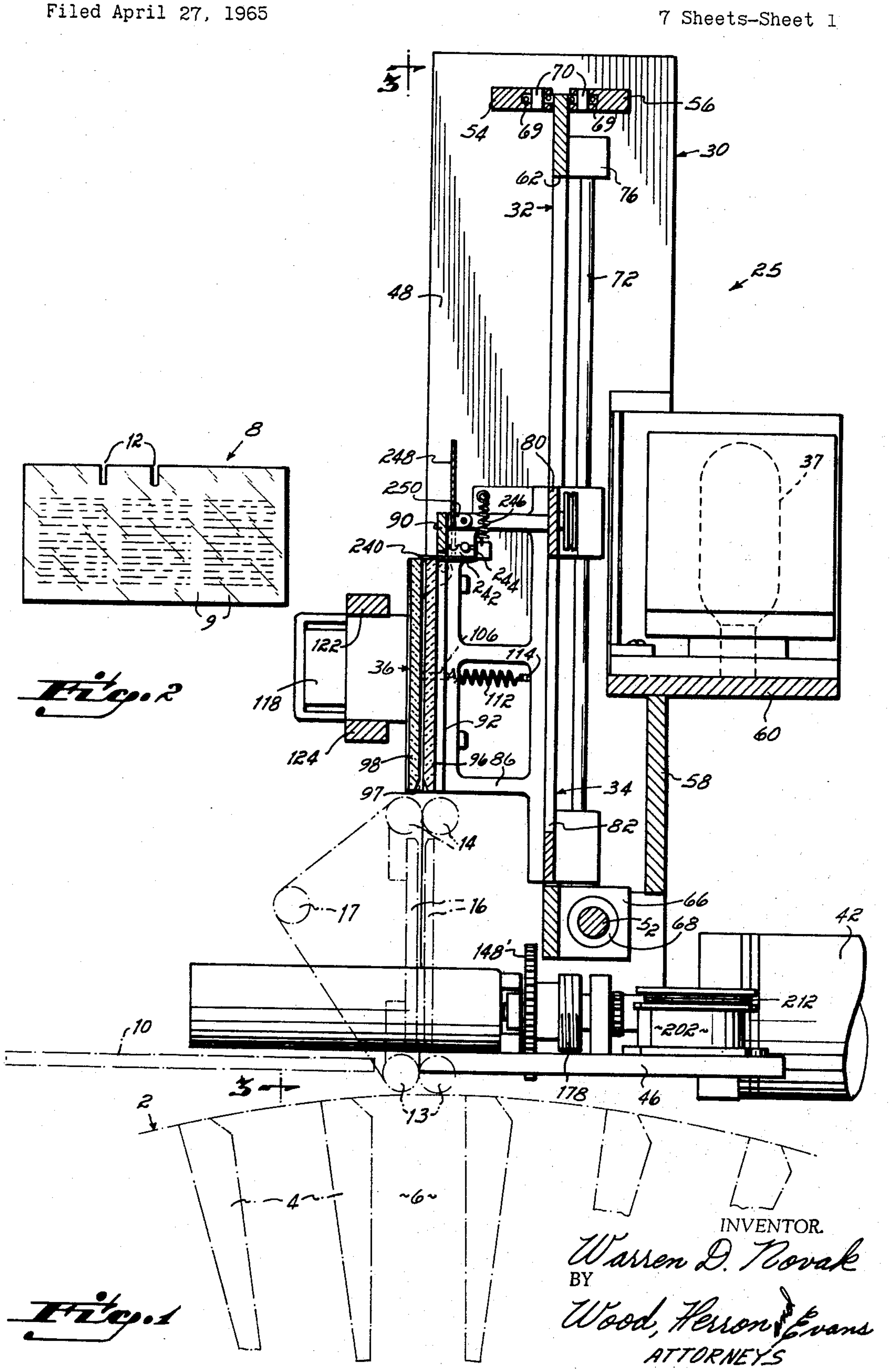
FIGURE 1 is a side elevational view, partially in cross-section, of the platen assembly of this invention and further showing in phantom a portion of the card storage and extraction mechanism.
FIGURE 2 is a plan view of a typical card that may be used with this invention.

Referring now to FIGURE 1, there is shown a portion of a rotatable filing drum 2 provided with partitions or walls 4 which define a plurality of pockets 6 therebetween for holding decks of multiple-image microfilm cards 8 of the type illustrated in FIGURE 2. The bottoms of the pockets 6 defined by the outer peripheral surface of the rotatable drum 2, are provided with openings into which an air ejection nozzle (not shown) may direct a stream of air so as to urge all of the cards in a selected pocket, upwardly against a selected pair of selector fingers 10. During the time the air nozzle is issuing a stream of air upwardly through the selected pockets 6, the selected fingers 10 are moved laterally or to the right as viewed in FIGURE 1 so that they are positioned over the nozzle and thus over the cards against which the air stream is acting. When a selected card of the deck of cards in the pocket 6 is located, it is forced upwardly by the air stream so that its notches 12 move over the fingers 10 to the depth of the notches and its upper edge is pinched between a pair of lower drive rollers 13 thereby identifying that card as the desired one. The air ejection nozzle is then closed, the extended fingers 10 are retracted to the position illustrated in FIGURE 1, and the selected card is withdrawn by means of the lower drive rollers 13 and upper drive rollers 14 which cooperate to drive the selected card upwardly into the movable platen of this invention. The structure heretofore described is all clearly and completely described in the above identified patent application Ser. No. 279,260.

Generally, the X-Y platen assembly 25 may be described as including a stationary frame or base 30, upon which a first slide 32 is movable in the horizontal or X direction. This slide 32 supports or carries a second slide 34 for vertical or Y movement. The second slide 34 includes a card clamping plate 36 so that a selected card 8 may be clamped and moved in both the X and Y or horizontal and vertical directions relative to a stationary projection lamp 37 or viewing apparatus (not shown).

Horizontal movement of the movable slide 32 relative to the stationary frame or base 30 is controlled by either one of a pair of motors 38, 40 while vertical movement of the second movable slide 34 is controlled by either one of a pair of motors 42, 44. The larger of these motors 38, 42 are servo motors used to control positioning of the card carrying slide 34 in one mode of control while the smaller motors 40, 42 are used to control positioning in a second mode of control as is explained hereinafter.

All of these motors 38, 40, 42, and 44 are fixedly secured to and supported upon the stationary frame 30 so that the inertia of the movable slides 32, 34 does not include that of one motor and is kept to a minimum. In keeping with this theme of minimizing the inertia of the slides, the motors 38, 40 are connected to the horizontally movable slide 32 by a flexible cable drive and similarly, the Y or vertical positioning motors 42, 44 are likewise connected by a flexible cable drive to the vertically movable slide 34.

The stationary frame 30 consists of a horizontal base plate 46 mounted upon the housing of the drum by brackets (not shown). This base plate 46 supports side plates 48, 50 and they, in turn, support a lower horizontal guide shaft or rod 52 and a pair of upper spaced guide rails 54, 56. Additionally, the side plates 48, 50 support a rear vertical plate 58 and a rear horizontal plate 60. The latter plate supports the projection lamp 37 which is used to project microfilm images 9 of cards 8 onto a screen or to light the images for viewing via a microtelevisor. Vertical plate 58 is used to support control elements which form no part of the invention of this application.

The horizontally movable slide 32 is generally rectangular in configuration and has a large rectangular opening or aperture 62 within which the slide 34 is movable. At each of its lower corners, the rectangular frame 32 supports rigidly attached guide blocks 64, 66. Each of these blocks is fitted with a bushing 68 (FIGURE 5) to accommodate free sliding movement of the frame 32 relative to the stationary guide rod 52.

To prevent pivoted movement of the frame or slide 32 relative to the guide rod 52, the upper end of the horizontally movable frame 32 rests within a slideway provided between the two spaced guide rods 54, 56. Each of these guide rods 54, 56 accommodates a roller bearing 69 journaled upon vertical pins 70 mounted within the guide bars 54, 56. Thus, the horizontally movable frame 32 is easily slideable over the guide rod 52.

Supporting the vertically movable slide 34 for movement relative to the horizontally movable slide 32 are a pair of vertical guide rods 72, 74. The tops of each of these rods are secured within support blocks 76 attached to the top rear corners of the horizontally movable slide 32. The lower ends of these rods 72, 74 are rigidly mounted within the lower support blocks 64, 66. Thus, the vertical guide rods 72, 74 are rigidly attached to and movable with the horizontally movable slide or frame 32.

The vertically movable slide 34 includes a rectangular frame 80 smaller than the rectangular aperture 62 of the horizontally movable frame 32 so that the vertically movable slide may move in a vertical direction within the aperture 62 of slide 32. This frame 80 likewise has a rectangular aperture 82 therein. Attached to the rear corners of the frame 80 are four slide or bearing blocks 83, each of which contains a ball bushing providing slideable engagement with shafts 72, 74.

Figure 7:
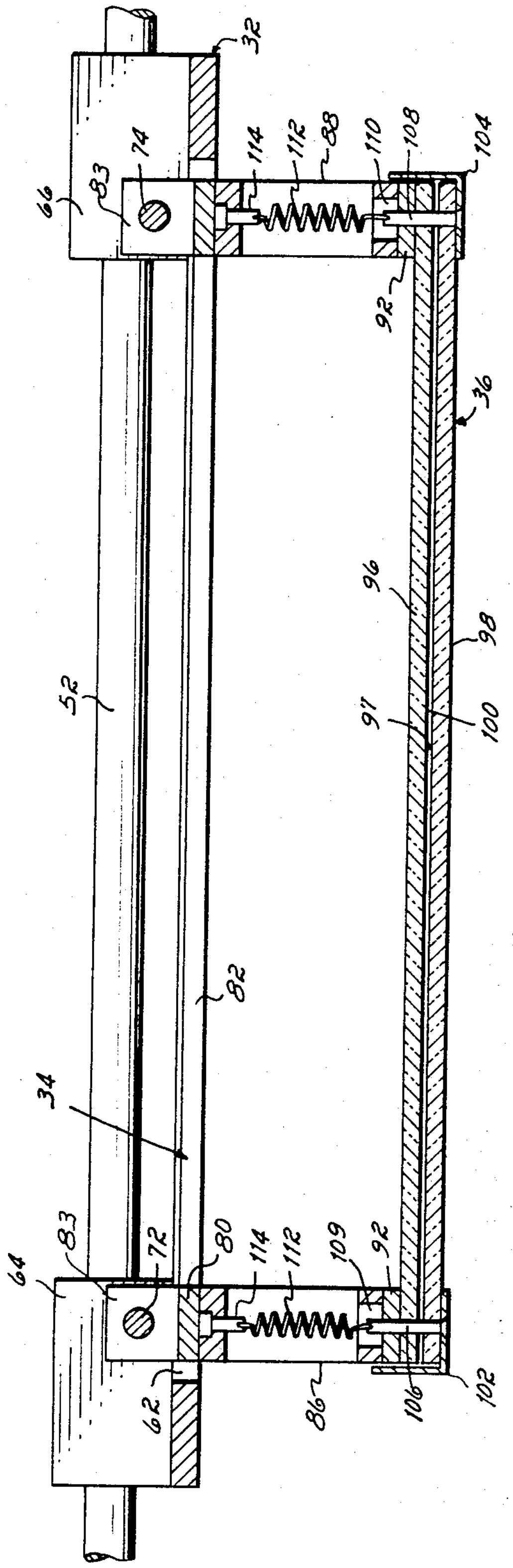
FIGURE 7 is a cross-sectional view taken along lines 7—7 of FIGURE 5.

As best shown in FIGURE 7, a pair of side plates 86, 88 extend forwardly from the two sides of the rectangular frame 80. These side plates 86, 88 are tied together at their extreme forward ends by an inverted U shaped bracket 90. Each leg 92 of the bracket 90 is bolted or otherwise rigidly attached to the side plates 86, 88. A rear glass support plate 96 extends between the legs 92 and is attached thereto by a suitable adhesive.

Movably mounted upon and in front of the rear support plate 96 is a glass clamping plate 98. To accommodate movement toward and away from the rear plate 96, the front plate 98 includes side support ferrous metal brackets 102, 104 adhesively secured thereto. As may be seen most clearly in FIGURE 7, each of the support brackets 102, 104 has a rearwardly extending pin 106, 108 attached thereto and extending through coaxial apertures 109, 110 in the front clamping plate 98, rear support plate 96, the side legs 92, and the forward wall of the side plates 86, 88. The rear end of each of these pins 106, 108 is attached to an extension spring 112, the opposite end of which is secured to a protruding pin 114 in the side plates 86, 88. Thus, the springs 112 normally bias or pull the front clamping plate 98 into engagement with the front surface 100 of the rear support plate 96. However, the front support plate may be pulled forwardly against the bias of the spring 112 and moved away from facial engagement with the rear support plate 96.

Movement of the front clamping plate 98 toward and away from the rear clamping plate 96 is controlled by a pair of electromagnets 118, 120. As may be seen most clearly in FIGURES 1 and 4, these electromagnets 118, 120 are fixedly attached to the stationary frame 30 by a pair of parallel support rods 122, 124 which extend between and are attached to the side plate 48, 50 of the stationary frame. These magnets are so positioned that they will effect movement of the front plate 98 away from the rear plate 96 only when the horizontal slide 32 and the vertical slide 34 are both in their zero or card receiving station. This station is located at the horizontal center of the stationary frame 30 and the lowermost position of the vertical frame within the horizontal frame 32. Only in this position are the ferrous metal support plates 102, 104 of the front clamping plate 98 positioned immediately behind the electromagnets 118, 120 where the magnets may act upon them to pull the front clamping plate 98 away from the rear support 96. When the clamping plate is moved forwardly, it provides a space 97 into which a selected card may be inserted by the lower transport rollers 13 and the upper transport rollers 14. When the clamping plate 98 is out of this zero position, the magnets cannot act upon the front support brackets 102, 104 and the clamping plate 98 remains in tight engagement with either the front face of a card located in the space 97 or in engagement with the front surface 100 of the rear plate 96. In other words, a card can only be inserted into or taken out of the platen when the horizontal slide 32 and the vertically movable slide 34 are both in their zero set position and when the magnets 118, 120 are energized.

Figure 8:
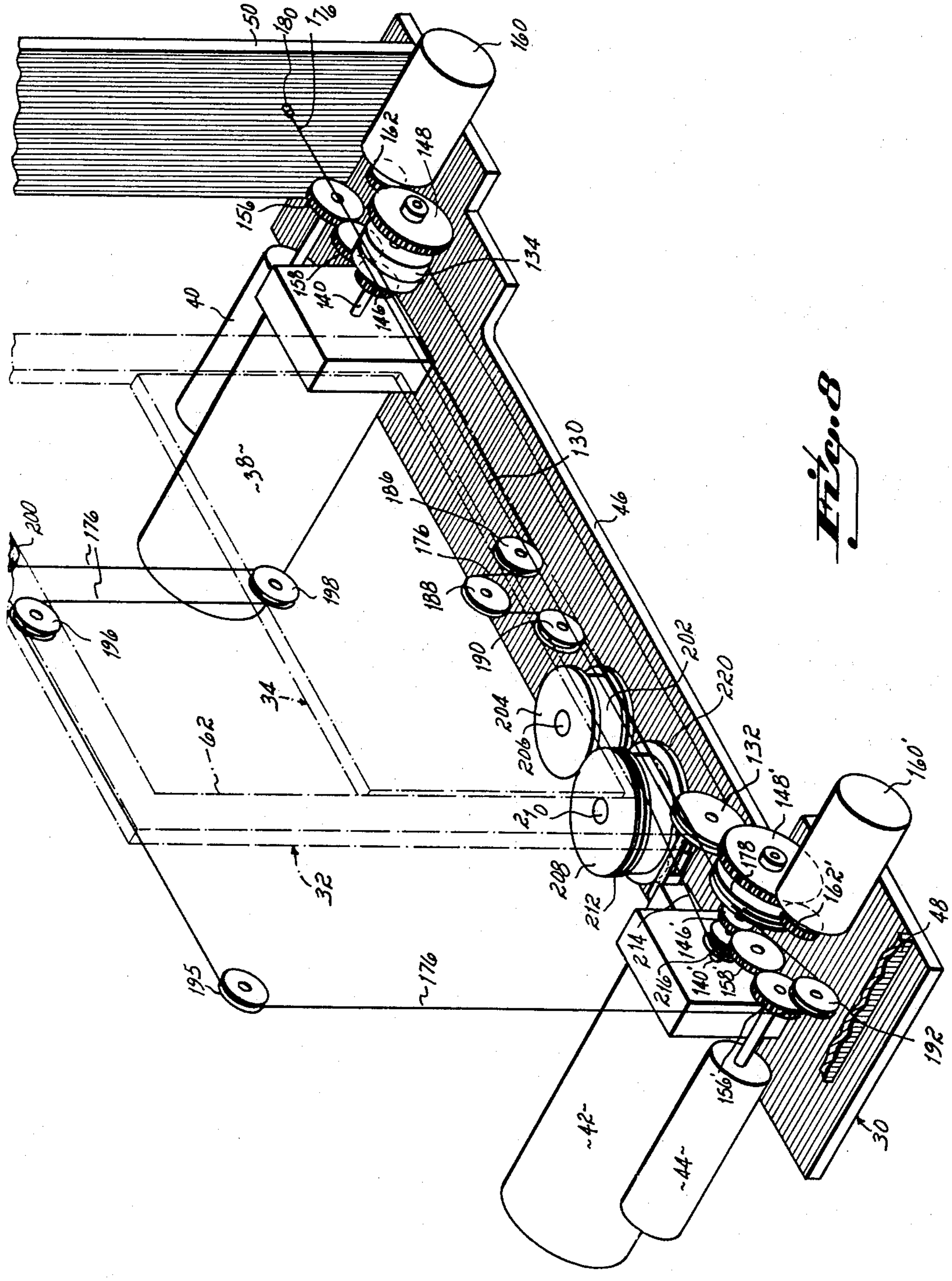
FIGURE 8 is a diagrammatic perspective view of the platen moving mechanism of FIGURE 3.

Movement of the horizontally movable frame or slide 32 is controlled by either the servo motor 38 or reversible electric motor 40 acting through an endless flexible cable 130. As may be seen in FIGURES 3 and 8, the endless flexible cable 130 is wrapped over an idler pulley 132 and makes several wraps over a drive pulley 134. The ends of the cable are attached by a stainless steel compression fitting 136 so that the cable is endless and nonstretchable. Intermediate its ends, the cable 130 is attached to a depending lug 138 attached to the bottom of the horizontal slide 32. Thus, upon rotation of the drive pulley 134, the depending lug 138 of the horizontally movable frame 32 is caused to move either toward or away from the drive pulley 134 depending upon the direction of rotation of the drive pulley 134. Pulley 134 is non-rotatably attached to the output shaft 140 of the servo motor 38. Also mounted upon the shaft 140 is a driven gear 146 and a driving gear 148. As may be seen most clearly in FIGURE 6, the shaft also passes through ball bearings 144, 150 mounted in support plates 142, 152 of the stationary frame 30. Rotation of the driven gear 146 is controlled by the reversible electric motor 40. The drive from the motor 40 to the driven gear 146 is through an electric clutch 154, to a driving gear 156 via an idler gear 158, to the driven gear 146 which is non-rotatably supported upon the shaft 140. When the servo motor 38 is used to control rotation of the driving pulley 134, the electric clutch 154 is de-energized so that the electric motor 40 need not be rotated by the servo motor 38 in order to drive the pulley 134. However, when the electric motor 40 is used to drive the pulley 134, the clutch 154 is engaged and the motor 40 used to drive the pulley 134 and the servo motor 38. Additionally, regardless of which motor 38 or 40 is used to drive the pulley, the driving gear 148 is used to drive a potentiometer 160 via a driven gear 162 attached to the input shaft of the potentiometer 160.

In actuality, the servo motor 38 is used to control positioning of the card mounted upon the platen in only one mode of control in which a selected aperture of the card is to be moved to a position in front of a viewing station. In this mode of control, the potentiometer 160 gives rise to a positon signal indicative of the actual position of the horizontal slide 32 in the X direction. This signal is compared with a command signal indicative of the desired position of the horizontal movable slide 32 and the resulting error signal is fed as an input into the servo motor 38 to control positioning of the horizontally movable slide 32. When the command signal matches the position signal of the potentiometer 160, the error signal is reduced to zero and the drive to the servo motor is stopped.

On the other hand, when the reversible electric motor 40 is used to control the drive to the drive pulley 134, the electric motor is under manual control and the potentiometer 160 forms no part of the control circuit to the motor 40. Likewise, in this latter or manual mode of operation, the servo motor 38 forms no part of the control circuit to control positioning of the horizontally movable slide 32.

In order to control tensioning of the cable 130, the idler pulley 132 is mounted upon a slideable block 164 which is in turn mounted upon a vertical support plate 166 of the frame 30. The support plate 166 also has a forwardly extending block 168 through which a positioning screw 170 extends. The end of the positioning screw 170 abuts against the movable block 164 so that upon rotation of the screw 170, the idler pulley supporting block 164 may be caused to move either toward or away from the drive pulley 34 depending upon the direction of rotation of the screw 170. Once adjusted, the adjusting screw may be locked in position by a lock nut 172.

Movement of the vertically movable slide 34 is also alternatively controlled by the servo motor 42 and/or the reversible electric motor 44 mounted upon the stationary frame 30 of the platen. The drive from the motors to the slide is also controlled by a single flexible cable 176. However, in this case, the cable is not an endless one but rather has its ends rigidly attached to the stationary frame as may be seen most clearly in FIGURES 3 and 8.

The drive system from the electric motor 44 and servo motor 42 to a drive pulley 178 of the vertical slide positioning system is identical to the drive between the drive pulley 134 and the motors 38, 40. Accordingly, those parts in the drive system to the vertically adjustable slide, which correspond to the parts in the drive system between the motors and the driven pulley of the horizontally movable system, have been given similar numerals followed by a prime mark.

Figures 3, 4:
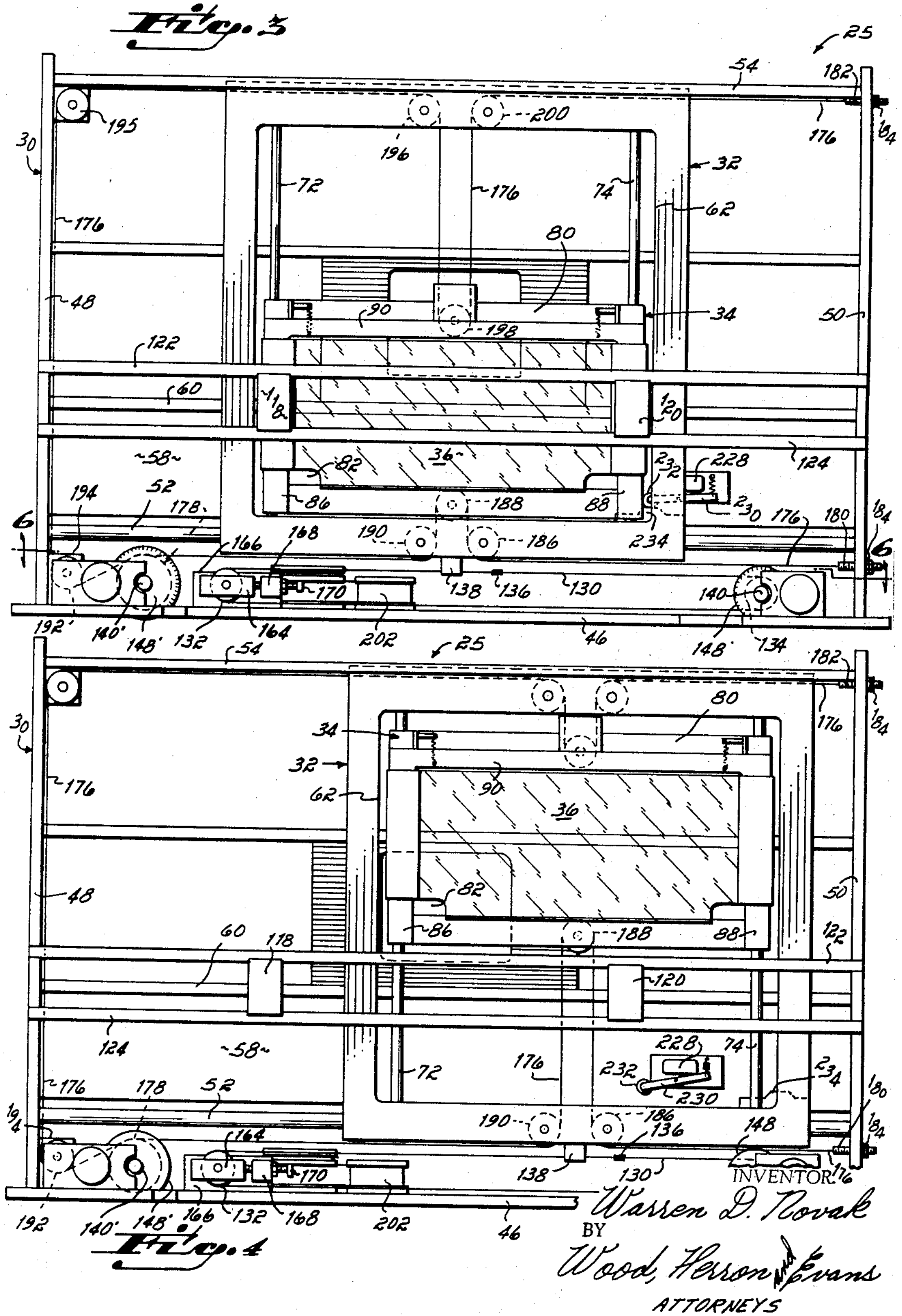
FIGURE 3 is a front elevational view of the platen assembly of FIGURE 1.
FIGURE 4 is a view similar to FIGURE 3 but with the platen assembly moved upwardly and to the right from the position illustrated in FIGURE 3.

The vertical control cable 176 is attached at its ends to adjustment screws 180 and 182 (FIGURE 3). Each of these screws may be adjusted within the side plate 50 of the stationary frame 30 and locked in position by lock nuts 184. Between its ends, the cable extends from the screw 180 to and around a first pulley 186 rotatably journaled on the lower side of the horizontally movable frame 32, upwardly over a pulley 188 rotatably journaled upon the lower side of the frame of the vertically movable slide 34, down beneath a second pulley 190 rotatably journaled upon the horizontally movable frame 32. From the idler pulley 190, the cable 176 extends to and makes several wraps around the drive pulley 178. From the drive pulley 178, the cable passes around an idler pulley 192 rotatably journaled upon a bracket 194 mounted upon the stationary frame 30. From the idler pulley 192, the cable passes around another idler pulley 195 rotatably journaled upon the stationary frame 30 and from there it passes around a fourth pulley 196 mounted upon the horizontally movable frame 32. After passing around the pulley 196, the cable 176 extends downwardly around a second pulley 198 rotatably journaled upon the vertically movable frame 34. Subsequently, the cable passes upwardly around a fourth idler pulley 200 mounted upon the horizontally movable frame 32 and subsequently to the adjustment screw 182.

In operation, rotation of either the servo motor 42 or the reversible electric motor 44 causes line to be paid out in the stretch of cable between the drive pulley 178 and the screw 182 and to be collected from that stretch of cable between the pulley 178 and the adjustment screw 180. When this happens, the vertically movable slide 34 is allowed to drop downwardly by the upper stretch of cable and is pulled downwardly by the lower stretch of cable. When the drive to the drive pulley 178 is reversed in direction, such that cable is collected from between the drive pulley 178 and the adjustment screw 180, the vertically movable slide 34 is caused to move upwardly.

In order that a relatively small servo motor 42 may be used to control vertical displacement of the vertically movable slide 34 and that its up and down speeds are essentially the same, the slide is counterbalanced by a so-called "Negator" spring 202. It is normally or in its relaxed position, supported upon a rotatable reel 204 which is in turn rotatable about a stationary pin 206 mounted in the base plate 46 of the stationary frame 30. The free end of the "Negator" spring 202 is attached to a second rotatable reel 208 mounted upon a pin 210 in the base 46 of the frame. Also mounted upon the pin 210 is a rotatable pulley 212 which is keyed to the reel 208 so that the two rotate together upon a pin 210. A cable 214 is wrapped around the pulley 212 and attached thereto. Cable 214 extends from the pulley 212 to and around another pulley 216 nonrotatably keyed to the output shaft 140' of the servo motor 42. Thus, upon rotation of the vertical drive pulley 178, the pulley 216 is caused to rotate and either collect cable 214 from the pulley 212 or pay it out to be collected upon the pulley 212 depending upon the direction of rotation of the drive pulley 178. When the drive pulley 178 is rotated in a direction to cause the vertically movable slide 34 to be raised or lifted, the "Negator" spring is collected upon the reel 204. The torsional effect of the spring is to counterbalance the weight of the vertically movable slide 34. On the other hand, when the drive pulley 178 is rotated in a direction to move the vertically movable slide downwardly, the spring must be pulled off the reel 204 onto the reel 208. Thus, the torsion in the spring acts to counterbalance the weight of the vertically movable slide and this slide has no tendency to drop when the motors are de-energized. Additionally, the "Negator" spring acts to minimize the energy input required by the motors to move the platen upwardly against the force of gravity.

Figure 6:
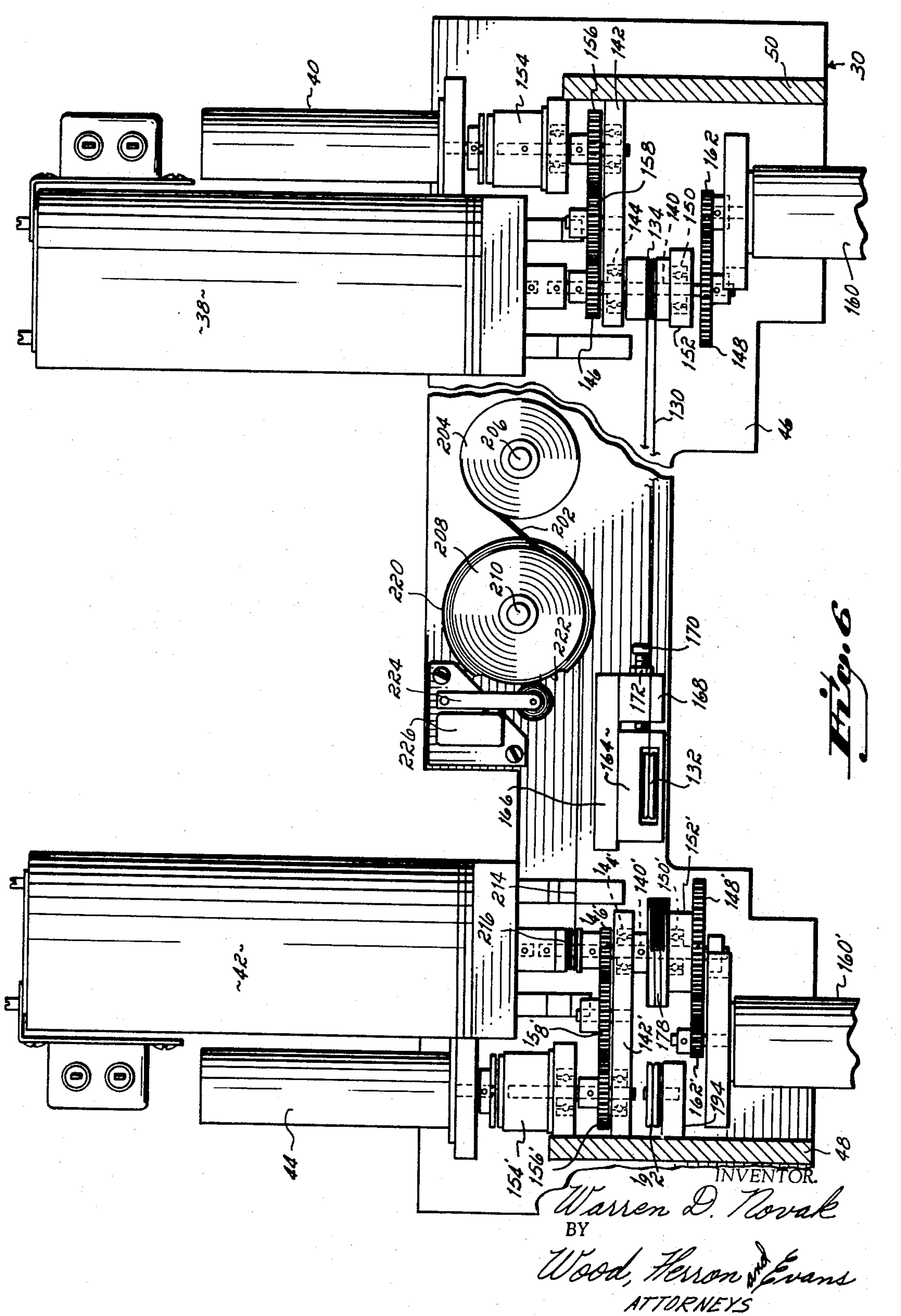
FIGURE 6 is a cross-sectional view taken along lines 6—6 of FIGURE 3.

Referring to FIGURE 6, it will be seen that a rotary cam 220 is also attached to the reel 208 upon which the "Negator" spring 202 is to be wound. This cam has a depressed or recessed section 222 through an arc of approximately 70° of the cam. The cam 220 is used to control a pivoted microswitch actuator arm 224 which in turn controls a microswitch 226.

When the actuator rod 224 is engaged with the lower section 222 of the cam 220, the microswitch 226 is not actuated, indicating that the vertically movable slide 34 is at its lowermost or card receiving position on the horizontally movable slide 32. As the vertically movable slide 34 moves upwardly, the cam 220 rotates until the high section of the cam causes the arm 224 to pivot and close the microswitch 226, thereby indicating that the slide is out of the zero or card receiving vertical position.

Referring to FIGURE 3, it will be seen that an additional microswitch 228 is mounted upon the stationary frame 30 and includes a pivoted actuator member 230 and roller 232 in position to be engaged by a cam 234 mounted upon the horizontally movable slide 32. When the horizontally movable slide is in a centered or zero position on the stationary frame, a high spot on the cam 234 causes the roller 232 and attached actuator arm 230 to be lifted and the switch 228 to be thus closed. Actuation of this switch 228 indicates that the horizontally movable slide is in the centered or zero position ready for reception or discharge of a card.

Figure 5:
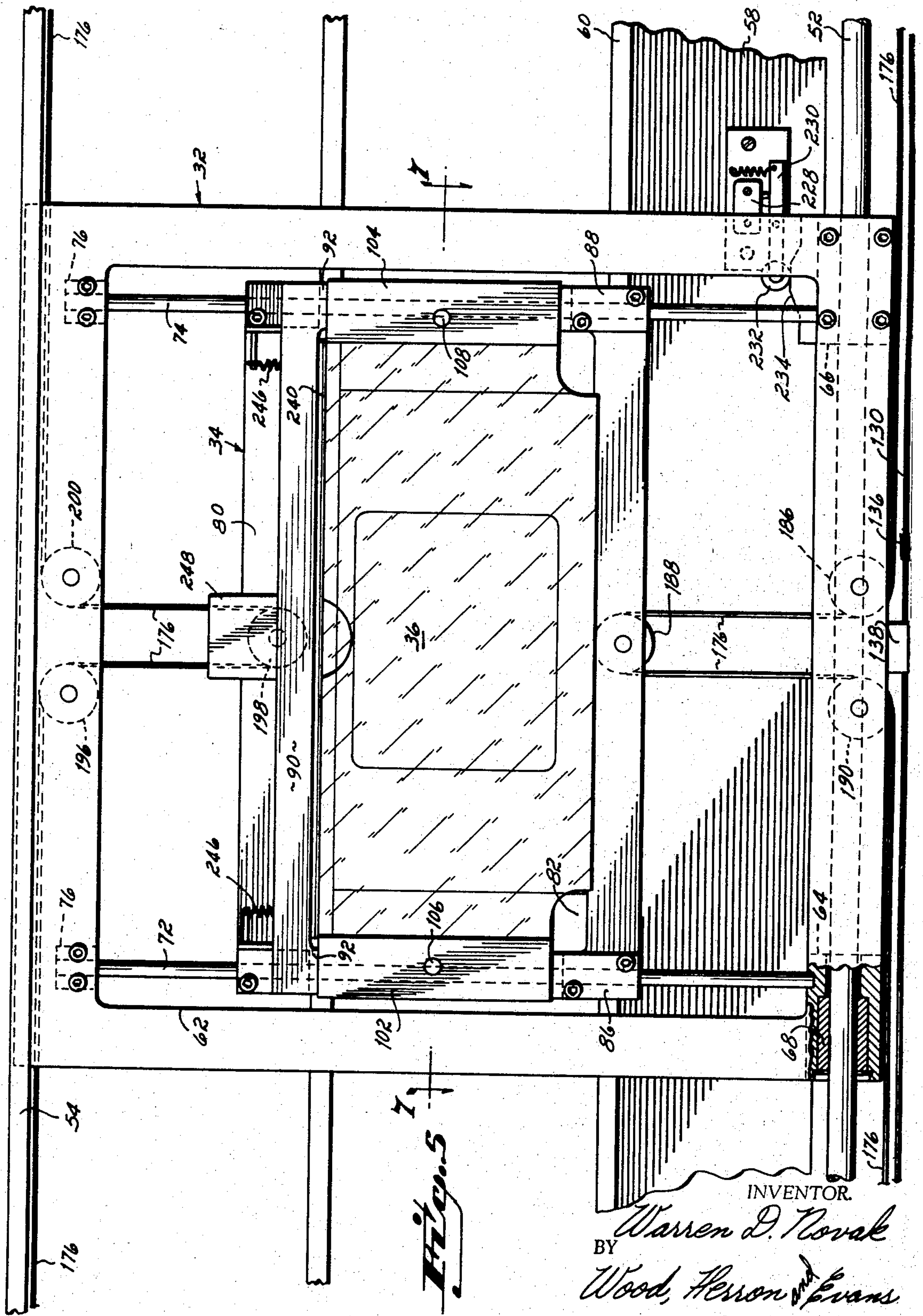
FIGURE 5 is an enlarged front elevational view of a portion of the structure illustrated in FIGURE 3.

As may be seen most clearly in FIGURES 1 and 5, a movable gate 240 in the form of a flat plate extends transversely across the tops of the support plates 86, 88. This plate serves as a gate to permit the withdrawal of a card through the top of the space 97 between the clamping plate 98 and rear support plate 96. At each end, the gate 240 has an upwardly extending flange 242. Each flange in turn has two arcuate notches in its upper surface which cooperate with a shaft 244 projecting inwardly from each of the support plates 86, 88 to locate the gate relative to the shafts 244. To bias the gate upwardly into engagement with the shafts 244, a pair of extension springs 246 extend between the gate 240 and pins in the side walls 86, 88 of the vertically movable slide 34.

Movement of the gate 240 is controlled by a vertical finger tab 248 which extends upwardly from and is movably attached to the gate 240. The tab 248 has a pair of rearwardly extending ears supported upon a pivot shaft 250 which is in turn supported upon the side plates 86, 88. Thus, when the finger tab 248 is pulled forwardly, the tab 248 and the attached gate 240 pivot about the pivot shaft 250 and move from a position in which the rear notch of flanges 242 are engaged with the shafts 244 to a position in which the front notches engage the shafts. The springs 246 insure that a selected notch remains in engagement with the shafts 244. So long as the forward notches are engaged with the shafts 244, cards may be passed upwardly through the gap 97 and out of the platen.

In operation, the drum 2 of the card file is rotated until a selected pocket of the file is located beneath the lower drive rollers 13 of the transport assembly. The selected pocket is then scanned by selector mechanism disclosed in the above identified U.S. patent application Ser. No. 279,260 until a selected card is found and caused to be raised into the lower drive rollers 13. These drive rollers are driven via a belt drive from a motor driven pulley 17 (FIGURE 1) so as to cause the selected card to be moved upwardly between a pair of transport plates 16 into upper drive rollers 14. These upper drive rollers continue the movement of the card upwardly into the space 97 between the rear support plate 96 of the platen positioning assembly and the front support plate 98 which is at this time held forwardly out of engagement with the rear support plate 96 by the energized electromagnets 118, 120. When the card engages the upper movable gate 240 of the transport assembly, it causes a microswitch (not shown) to be actuated indicating that the selected card has been found and is located in the platen. Actuation of this microswitch causes the electromagnets 118, 120 to be de-energized so that the springs 112 may pull the front plate 98 inwardly and thus clamp the selected card between the two plates 96, 98. Actuation of the microswitch also causes de-energization of the drive roll motor thus stopping the upward movement of the card. The platen may then move away from the zero or card receiving station in a Y or vertical direction. The card should not be moved horizontally at this point until the bottom of the card has cleared the rollers 14 in order that the card will not be damaged by frictional engagement with the rollers. After the card has moved upwardly a slight distance sufficient to cause the cam 220 (FIGURE 6) to actuate the microswitch 226, the horizontally movable slide 32 may be moved in the X direction under the control of one of the motors 38 or 40. Any image 9 of a selected card 8 may thus be positioned in front of the projection lamp 37 or in front of a stationary viewing mechanism such as a microtelevisor.

To return the selected card to the card file or drum 2, the horizontally movable slide 32 is first moved to a centered position at which the roller 232 of the actuating arm 230 is lifted by engagement with the cam 234 attached to the slide. This causes the microswitch 228 to be actuated indicating that the horizontally movable slide is in position and that the vertically movable slide may now be moved downwardly so as to drive the bottom edge of the card into the upper drive rolls 14 of the transport mechanism. When the vertically movable slide is all the way down in its zero or home position as shown in FIGURE 3, the electromagnets 118 and 120 are energized pulling the front clamping plate 98 of the vertically movable slide assembly 34 away from the rear plate 96. The selected card may then be returned to the drum 2 by the transport rollers 14 and 13.

Figures 9, 10:
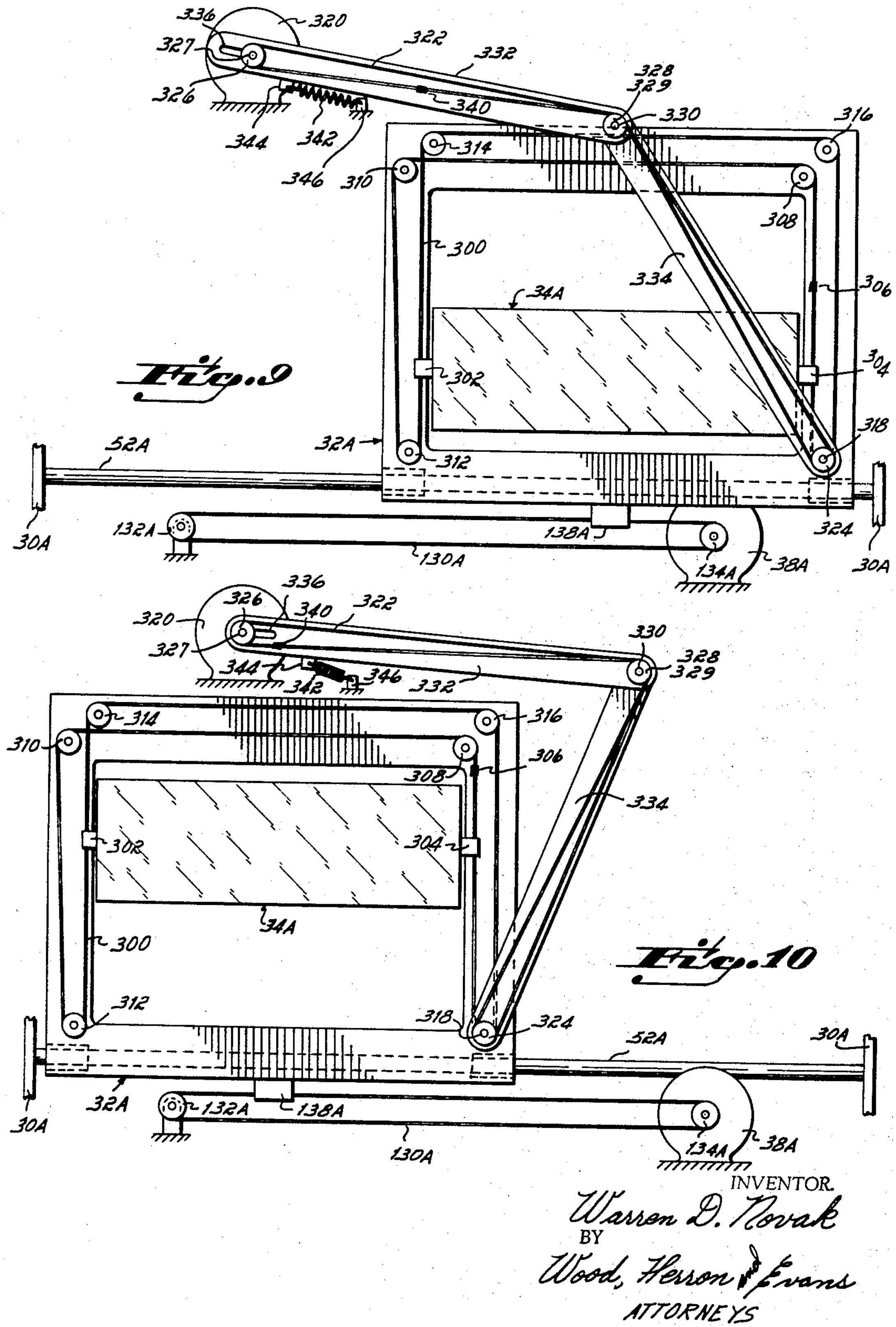
FIGURE 9 is a diagrammatic front elevational view of a second embodiment of an X-Y platen assembly.
FIGURE 10 is a view similar to FIGURE 9 but with the card carrying slide moved to the left and upwardly from the position illustrated in FIGURE 9.

Referring now to FIGURES 9 and 10, there is illustrated schematically a second modification of the invention of this application. This modification is identical to that illustrated in FIGURES 1–8 except that the connection between the vertically movable slide and the motor which controls vertical displacement involves a different cable arrangement.

For purposes of identification, elements or structure of FIGURES 9 and 10, which corresponds to identical structure of the embodiment illustrated in FIGURES 1–8 has been given identical numerals followed by the suffix *a*.

As in the case of the embodiment illustrated in FIGURES 1–8, the horizontally movable slide 32*a* is controlled by an electric motor 38*a* acting through an endless flexible cable 130*a* attached to a depending lug 138*a* of the slide 32*a*. The slide 32*a* is movable over a horizontal guide rod 52*a* attached to the stationary base 30*a*.

As in the case of the earlier described embodiment, the horizontally movable slide 32*a* supports a vertically movable slide 34*a*. This latter slide 34*a* differs from that described in the earlier embodiment only in the manner in which it is attached to the flexible cable 300, which controls its movement. In this embodiment, the slide 34*a* has a pair of laterally extending ears 302, 304, each of which is rigidly connected to one stretch of the cable 300.

The cable 300, which controls vertical displacement of the slide 34*a*, is an endless nonstretchable, flexible cable having its ends connected together by a stainless steel compression fitting 306. From this connector 306, the cable passes around a pulley 308 in the upper right-hand corner of the horizontally movable frame 32*a*, to and around a pulley 310 in the upper left-hand corner of the frame 32*a*, down and around a third pulley 312 mounted upon the horizontally movable frame 32, upwardly to and around a fourth pulley 134 attached to the upper left-hand corner of the frame 32*a*, to and around a fifth pulley 136 in the upper right-hand corner of the horizontally movable frame 32*a*, downwardly around a drive pulley (not shown) keyed to a drive shaft 318 in the lower right-hand corner of the frame 32*a*, and upwardly to the connector 306. Between the drive pulley on shaft 318 and the pulley 308, the cable 300 is connected to the ear 304 of frame 34*a* and in a similar fashion, the cable 300 is connected to the ear 302 of the vertical movable frame 32*a* between the pulleys 312 and 314. All of the pulleys, 308, 310, 312, 314 and 316 are idler pulleys rotatably journaled upon pivot shafts attached to the horizontally movable frame 32*a*. The drive pulley, however, is keyed to the drive shaft 318, which is in turn rotatable within the horizontally movable frame 32*a*.

Power to the drive shaft 318 is provided by a reversible electric motor or servo motor 320 through an endless flexible cable 322 to a drive pulley 324 mounted upon the drive shaft 318. The connection between the pulley 324 and the motor 320 includes a drive pulley 326 mounted upon the output shaft 327 of the motor 320 and a pair of independently rotatable idler pulleys 328, 329 independently rotatable upon a common support shaft 330. The support shaft 330 is in turn supported at the elbow or joint of a pair of support arms 332, 334 and forms a pivot connection between the arms 332, 334. At the end opposite the connection to the pivot pin 330, the lower end of the arm 334 is pivotally connected to the drive shaft 318 so that it may freely rock about the shaft 318. The end of the arm 332 opposite the elbow, is pivotable about the drive shaft 327 of the motor 320 and is movable longitudinally relative to that shaft 327. In order to accommodate this longitudinal movement of the arm 332 relative to the motor shaft 327, the arm 332 has a longitudinal slot 336 through which the motor shaft 327 extends.

The cable 322, which connects the drive pulley 338 of the motor 320 to the drive pulley 324, is an endless flexible cable having its ends joined by a stainless steel compression fitting 340 identical to the connector 306. Between the connected ends of the cable 322, it passes over the idler pulley 328 to and around the drive pulley 324, around the idler pulley 329, around the drive pulley 326 of the motor 320 and back to the connector 340.

As the slide 32*a* is moved horizontally, the angle between the arms 332, 334 changes, and in so doing, changes the length of cable 322 required to extend from the drive pulley 326 to the pulley 324. The simplest way to accommodate this change of length of the cable would be to use a spring as a connector between the ends of the cable 322 rather than a rigid steel connector 340. This, however, raises the problems of controlling the vertical displacement of the slide 34*a* by means of a servo motor or similar electrical control because a given angular displacement of the motor 320 would then result in different vertical displacements of the slide 34*a* depending upon the horizontal position of the slide 32*a*. If the displacement is to be accurately controlled, the cable 322 must be nonstretchable and must be maintained in a taut condition. To this end, an extension spring 342 is connected at one end to a depending lug 344 of the arm 332 and at its opposite end to a protrusion 346 on the frame 30*a* of the machine. This spring 342 normally biases the arm 332 to the right so as to maintain a preset tension or tautness in the cable 322. Thus, a selected angular displacement of the motor 320 always results in an identical vertical displacement of the slide 34*a*.

It will be noted that both embodiments of the invention of this application utilize a pair of independently rotatable motors to control horizontal and vertical displacement of a card carrying platen. In both cases, both of the motors are mounted upon a stationary frame and the connection between the motors and the slide includes a nonstretchable, flexible metal cable, which minimizes the inertia of the system and in so doing minimizes the problem of accurately controlling the position of the slides.

While only two embodiments of the invention have been disclosed and described herein, those skilled in the art to which this invention pertains, will readily appreciate numerous changes and modifications which may be made in the disclosed apparatus without departing from the spirit of the invention. Therefore, I do not intend to be limited except by the appended claims. Having described my invention, I claim:

1. A positioning apparatus for locating a multi-image microfilm card in front of a viewing station, said apparatus comprising
   - a stationary frame,
   - a first movable frame mounted upon said stationary frame for reciprocal movement in one direction,
   - a second movable frame mounted upon said first movable frame for reciprocal movement in a second direction normal to said one direction whereby said second frame is carried by said first movable frame in said one direction and is independently movable relative to said first frame in said second direction,
   - means for securing a multi-image microfilm card upon said second frame,
   - a pair of motor means fixedly mounted upon said stationary frame, and
   - means connecting each of said motor means to one of said movable frames whereby said motors are cooperatively operable to control positioning a card secured to said second frame.
2. A positioning apparatus comprising
   - a stationary frame,
   - a first movable frame mounted upon said stationary frame for reciprocal movement in one direction,
   - a second movable frame mounted upon said first movable frame for reciprocal movement in a second direction whereby said second frame is carried by said first movable frame in said one direction and is independently movable relative to said first frame in said second direction,
   - a pair of independently operable motor means fixedly mounted upon said stationary frame, and
   - means including flexible cables connecting each of said motor means to one of said movable frames whereby said motors are cooperatively operable to control positioning of said second frame.
3. A positioning apparatus for locating an information carrying card in front of a read out station, said apparatus comprising
   - a stationary frame,
   - a first movable frame mounted upon said stationary frame for reciprocal movement in one direction,
   - a second movable frame mounted upon said first movable frame for reciprocal movement in a second direction normal to said one direction whereby said second frame is carried by said first movable frame in said one direction and is independently movable relative to said first frame in said second direction,
   - means for securing a card upon said second frame,
   - a pair of motor means fixedly mounted upon said stationary frame, and
   - means connecting each of said motor means to one of said movable frames whereby said motors are cooperatively operable to control positioning of a card secured to said second frame.
4. A positioning apparatus for locating an information carrying card in front of a read out station, said apparatus comprising a stationary frame, a first movable frame mounted upon said stationary frame for reciprocal movement in one direction, a second movable frame mounted upon said first movable frame for reciprocal movement in a second direction normal to said one direction whereby said second frame is carried by said first movable frame in said one direction and is independently movable relative to said first frame in said second direction, means for securing a card upon said second frame, a pair of independently operable motor means fixedly mounted upon said stationary frame, and means including flexible cables connecting each of said motor means to one of said movable frames whereby said motors are cooperatively operable to control positioning of a card secured to said second frame.

5. A positioning apparatus for locating an information carrying card in front of a read out station, said apparatus comprising a stationary frame, a first movable frame mounted upon said stationary frame for reciprocal movement in one direction, a second movable frame mounted upon said first movable frame for reciprocal movement in a second didection normal to said one direction whereby said second frame is carried by said first movable frame in said one direction and is independently movable relative to said first frame in said second direction, means for securing a card upon said second frame, a pair of independently operable motor means fixedly mounted upon said stationary frame, and means connecting each of said motor means to one of said movable frames whereby said motors are cooperatively operable to control positioning of a card secured to said second frame, said means for connecting said second movable frame to one of said motors including a flexible cable.

6. A positioning apparatus comprising a stationary frame, a first movable frame mounted upon said stationary frame for reciprocal movement in one direction, a second movable frame mounted upon said first movable frame for reciprocal movement in a second direction normal to said one direction whereby said second frame is carried by said first movable frame in said one direction and is independently movable relative to said first frame in said second direction, a pair of independently operable motor means fixedly mounted upon said stationary frame, and means connecting each of said motor means to one of said movable frames whereby said motors are cooperatively operable to control positioning of said second frame, said means for connecting said second movable frame to one of said motors including a flexible cable.

7. The apparatus of claim 6 wherein said means for connecting said first movable frame to the other of said motors includes an endless flexible cable.

8. The apparatus of claim 6 wherein a counterbalance means is attached to one of said movable frames.

9. A positioning apparatus comprising a stationary frame, a first movable frame mounted upon said stationary frame for reciprocal movement in one direction, a second movable frame mounted upon said first movable frame for reciprocal movement in a second direction normal to said one direction whereby said second frame is carried by said first movable frame in said one direction and is independently movable relative to said first frame in said second direction, a pair of independently operable motor means fixedly mounted upon said stationary frame, and means connecting each of said motor means to one of said movable frames whereby said motors are cooperatively operable to control positioning of said second frame, said means for connecting said second movable frame to one of said motors including a flexible cable wrapped around a pair of pulleys mounted upon opposite sides of said second frame.

10. The apparatus of claim 9 wherein said means for connecting said first movable frame to the other of said motors includes an endless flexible cable.

11. The apparatus of claim 9 including counterbalance means attached to one of said frames.

12. The apparatus of claim 9 wherein opposite ends of said flexible cable are attached to said stationary frame.

13. The apparatus of claim 12 wherein said motor means include a pair of independently operable servo motors.

14. The apparatus of claim 13 including a pair of variable resistance potentiometers operatively connected to each of said frames for indicating the position of said frames relative to said stationary frame.

15. A positioning apparatus for locating an information carrying card in front of a read out station, said apparatus comprising a stationary frame, a first movable frame mounted upon said stationary frame for reciprocal movement in one direction, a second movable frame mounted upon said first movable frame for reciprocal movement in a second direction normal to said one direction whereby said second frame is carried by said first movable frame in said one direction and is independently movable relative to said first frame in said second direction, means for securing a card upon said second frame, a pair of independently operable motor means fixedly mounted upon said stationary frame, and means connecting each of said motor means to one of said movable frames whereby said motors are cooperatively operable to control positioning of a card secured to said second frame, said means for connecting said second movable frame to one of said motors including flexible cable means extending around a pulley mounted upon a movable arm.

16. The apparatus of claim 15 wherein said means for connecting said first movable frame to the other of said motors includes an endless flexible cable.

17. A positioning apparatus for locating an information carrying card in front of a read out station, said apparatus comprising a stationary frame, a first movable frame mounted upon said stationary frame for reciprocal movement in one direction, a second movable frame mounted upon said first movable frame for reciprocal movement in a second direction normal to said one direction whereby said second frame is carried by said first movable frame in said one direction and is independently movable relative to said first frame in said second direction, means for securing a card upon said second frame, a pair of independently operable motor means fixedly mounted upon said stationary frame, and means connecting each of said motor means to one of said movable frames whereby said motors are cooperatively operable to control positioning of a card secured to said second frame, said means for connecting said second movable frame to one of said motors including flexible cable means extending around a first pulley mounted at the elbow of a pair of movable arms.

18. The apparatus of claim 17 wherein said means for connecting said first movable frame to the other of said motors includes an endless flexible cable.

19. The apparatus of claim 17 wherein said second frame is attached at opposite sides to an endless flexible cable.

20. The apparatus of claim 19 wherein said endless flexible cable is driven by a second pulley mounted upon said first movable frame.

21. The apparatus of claim 17 wherein the distance between said first movable pulley and the motor by which it is driven is variable.

22. The apparatus of claim 17 between said stationary frame and one of said pair of movable arms wherein spring means is provided to maintain tautness in the cable which extends around said first pulley means.

23. A positioning apparatus for locating a multi-image card in front of a viewing station, said apparatus comprising
- a stationary frame,
- a first movable frame mounted upon said stationary frame for reciprocal movement in one direction,
- a second movable frame mounted upon said first movable frame for reciprocal movement in a second direction normal to said one direction whereby said second frame is carried by said first movable frame in said one direction and is independently movable relative to said first frame in said second direction,
- means including an electromagnetically-retractable, spring-loaded, transparent plate for securing a multi-image card upon said second frame,
- a pair of motor means mounted upon said stationary frame, and
- means connecting each of said motor means to one of said movable frames whereby said motors are cooperatively operable to control positioning a card secured to said second frame.

24. A positioning apparatus for locating an information carrying card in front of a read out station, said apparatus comprising
- a stationary frame,
- a first movable frame mounted upon said stationary frame for reciprocal movement in one direction,
- a second movable frame mounted upon said first movable frame for reciprocal movement in a second direction normal to said one direction whereby said second frame is carried by said first movable frame in said one direction and is independently movable relative to said first frame in said second direction,
- means including an electromagnetically-retractable, spring-loaded, transparent plate for securing a card upon said second frame,
- a pair of motor means mounted upon said stationary frame, and
- means connecting each of said motor means to one of said movable frames whereby said motors are cooperatively operable to control positioning of a card secured to said second frame.

25. A positioning apparatus for locating an information carrying card in front of a read out station, said apparatus comprising

- a stationary frame,
- a first movable frame mounted upon said stationary frame for reciprocal movement in one direction,
- a second movable frame mounted upon said first movable frame for reciprocal movement in a second direction normal to said one direction whereby said second frame is carried by said first movable frame in said one direction and is independently movable relative to said first frame in said second direction,
- means including an electromagnetically-retractable, spring-loaded, transparent plate for securing a card upon said second frame,
- a pair of independently operable motor means mounted upon said stationary frame, and
- means including flexible cables connecting each of said motor means to one of said movable frames whereby said motors are cooperatively operable to control positioning of a card secured to said second frame.

26. A positioning apparatus for locating an information carrying card in front of a read out station, said apparatus comprising
- a stationary frame,
- a first movable frame mounted upon said stationary frame for reciprocal movement in one direction,
- a second movable frame mounted upon said first movable frame for reciprocal movement in a second direction normal to said one direction whereby said second frame is carried by said first movable frame in said one direction and is independently movable relative to said first frame in said second direction,
- means including an electromagnetically-retractable, spring-loaded, transparent plate for securing a card upon said second frame,
- a pair of independently operable motor means mounted upon said stationary frame, and
- means connecting each of said motor means to one of said movable frames whereby said motors are cooperatively operable to control positioning of a card secured to said second frame, said means for connecting said second movable frame to one of said motors including a flexible cable.

References Cited

UNITED STATES PATENTS

| | | | |
|---|---|---|---|
| 2,690,696 | 10/1954 | Ashton | 88—24 |
| 3,010,376 | 11/1961 | Johnson | 95—4.5 X |
| 3,052,174 | 9/1962 | Berger | 88—24 X |
| 3,247,761 | 4/1966 | Herreman et al. | 95—4.5 X |

NORTON ANSHER, *Primary Examiner.*

RICHARD A. WINTERCORN, *Assistant Examiner.*